United States Patent
Propheter-Hinckley et al.

(10) Patent No.: US 9,074,482 B2
(45) Date of Patent: Jul. 7, 2015

(54) AIRFOIL SUPPORT METHOD AND APPARATUS

(75) Inventors: Tracy A. Propheter-Hinckley, Manchester, CT (US); David P. Houston, Glastonbury, CT (US); Anita L. Tracy, Middletown, CT (US)

(73) Assignee: UNITED TECHNOLOGIES CORPORATION, Hartford, CT (US)

(*) Notice: Subject to any disclaimer, the term of this patent is extended or adjusted under 35 U.S.C. 154(b) by 606 days.

(21) Appl. No.: 13/454,599

(22) Filed: Apr. 24, 2012

(65) Prior Publication Data
US 2013/0280074 A1 Oct. 24, 2013

(51) Int. Cl.
F01D 5/14 (2006.01)
F04D 29/32 (2006.01)
F04D 29/38 (2006.01)

(52) U.S. Cl.
CPC ........... *F01D 5/147* (2013.01); *Y10T 29/49236* (2015.01); *F04D 29/324* (2013.01); *F04D 29/388* (2013.01); *Y02T 50/673* (2013.01)

(58) Field of Classification Search
CPC ............ F01D 5/147; F01D 5/18; B64C 11/24
USPC .......................... 416/233; 29/889.72, 889.721
See application file for complete search history.

(56) References Cited

U.S. PATENT DOCUMENTS

| | | | |
|---|---|---|---|
| 2,343,918 A | 5/1943 | McCoy | |
| 2,744,723 A * | 5/1956 | Roush | 416/96 R |
| 4,815,939 A | 3/1989 | Doble | |
| 5,038,014 A | 8/1991 | Pratt et al. | |
| 5,165,860 A | 11/1992 | Stoner et al. | |
| 5,253,824 A | 10/1993 | Halila et al. | |
| 5,558,497 A | 9/1996 | Kraft et al. | |
| 5,837,960 A | 11/1998 | Lewis et al. | |
| 5,947,688 A * | 9/1999 | Schilling et al. | 416/233 |
| 5,971,708 A * | 10/1999 | Lee | 416/97 R |
| 6,391,251 B1 | 5/2002 | Keicher et al. | |
| 6,669,447 B2 | 12/2003 | Norris et al. | |
| 7,029,232 B2 | 4/2006 | Tuffs et al. | |
| 7,112,044 B2 | 9/2006 | Whitehead et al. | |
| 7,121,800 B2 | 10/2006 | Beattie | |
| 7,121,801 B2 | 10/2006 | Surace et al. | |
| 7,125,225 B2 | 10/2006 | Surace et al. | |
| 7,217,093 B2 | 5/2007 | Propheter et al. | |
| 7,270,517 B2 | 9/2007 | Garner | |
| 7,293,962 B2 * | 11/2007 | Fried et al. | 416/97 R |
| 7,334,997 B2 * | 2/2008 | Karafillis | 416/224 |
| 7,478,994 B2 | 1/2009 | Cunha et al. | |
| 7,544,044 B1 | 6/2009 | Liang | |
| 7,857,588 B2 | 12/2010 | Propheter-Hinckley et al. | |
| 2007/0243070 A1 | 10/2007 | Matheny | |
| 2008/0290215 A1 | 11/2008 | Udall et al. | |

(Continued)

FOREIGN PATENT DOCUMENTS

EP 2330294 A1 6/2011

OTHER PUBLICATIONS

International Search Report and Written Opinion for International Application No. PCT/US2013/035694 completed Jun. 20, 2013.

*Primary Examiner* — Ninh H Nguyen
(74) *Attorney, Agent, or Firm* — Carlson, Gaskey & Olds P.C.

(57) ABSTRACT

A support for an airfoil includes a trunk and a limb extending from the trunk for distribution within the airfoil.

17 Claims, 3 Drawing Sheets

(56) References Cited

U.S. PATENT DOCUMENTS

| | | |
|---|---|---|
| 2009/0010765 A1 | 1/2009 | Propheter-Hinckley et al. |
| 2009/0258168 A1 | 10/2009 | Barcock et al. |
| 2009/0304497 A1 | 12/2009 | Meier et al. |
| 2011/0048664 A1 | 3/2011 | Kush et al. |
| 2013/0004680 A1* | 1/2013 | Godfrey et al. ............... 427/554 |
| 2013/0195673 A1* | 8/2013 | Godfrey et al. ........... 416/241 R |

* cited by examiner

AIRFOIL SUPPORT METHOD AND APPARATUS

BACKGROUND

Airfoils are manufactured by many processes including casting, forging machining, gluing, welding, brazing and combinations of those methods. It is a common goal in using the methods to make the lightest and strongest blades possible to deal with the environments and forces encountered by the airfoils including aerodynamic forces, high and low temperatures, centrifugal and centripetal forces, mechanical impacts etc.

Additionally in the manufacturing of airfoils, many problems are encountered: the interior geometries of some airfoils may be quite complex especially if the airfoil is exposed to high temperatures; the materials used to deal with these environments and forces may be quite expensive and hard to work with; and if the airfoils are used in aviation, reducing the weight of an airfoil is important to increase the overall efficiency of the aircraft using the airfoils.

SUMMARY

According to an embodiment disclosed herein, a support for an airfoil includes a trunk and a limb extending from the trunk for distribution within the airfoil.

According to a further embodiment of the invention, a method for constructing a support for an airfoil includes the steps of creating a support having a trunk and a limb extending from the trunk for distribution within the airfoil by using a direct metal manufacturing tool.

According to a still further embodiment of the invention, a method of optimizing a size and shape of a support for an airfoil includes the steps of designing a desired shape of an airfoil, estimating a desired shape for a support having a trunk and a limb extending from the trunk for distribution within the airfoil, and creating an integral of Φ for cross-sections of the airfoil and the support within the airfoil.

DESCRIPTION

Figure 1:
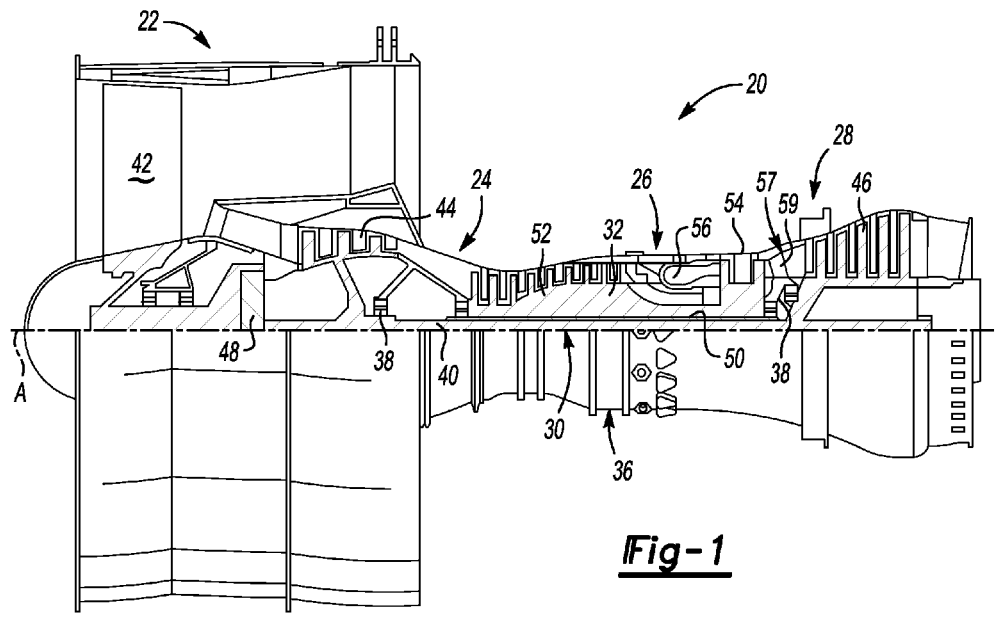
FIG. 1 shows a cut-away view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path while the compressor section 24 drives air along a core flow path for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including, but not limited to, three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes. One of ordinary skill in the art will recognize that the teachings herein are applicable to other engine architectures.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 54, 56 rotationally drive the respective low speed spool 30 and high speed spool 32 in response to the expansion.

Figure 2:
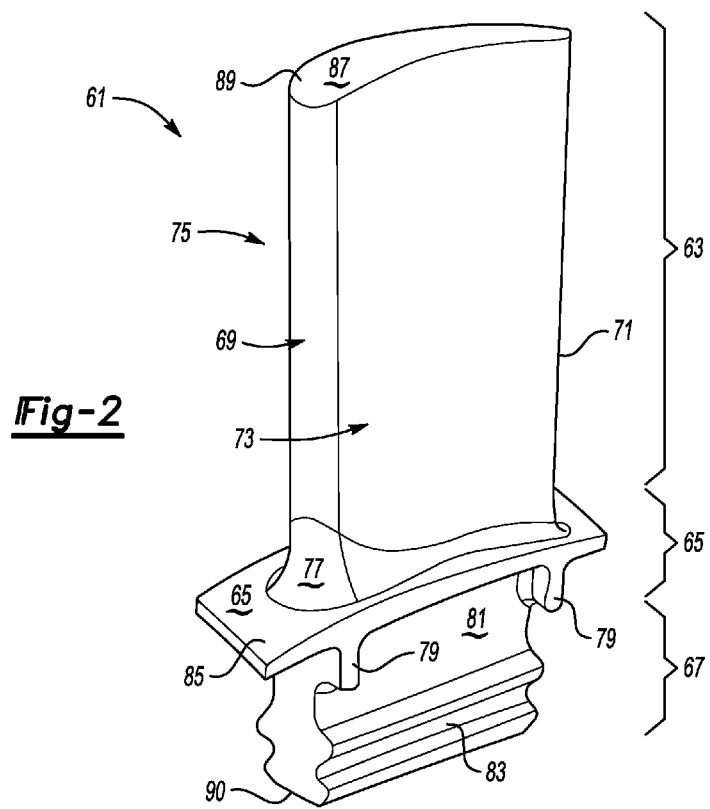
FIG. 2 shows a perspective view of an airfoil that may be utilized in the engine of FIG. 1.

Referring now to FIG. 2, an exterior of an airfoil 63, which can be, as a non-limiting example, a component of any of the fans 42, compressor 24, or turbines 28 described or shown herein or a portion of a vane 24. A blade 61 has an airfoil 63, a platform 65, and a root 67. The blade 61 has a leading edge 69, a trailing edge 71, a pressure side 73, and a suction side 75. The airfoil 63 is connected to the platform 65 by a fillet 77, and the platform 65 is connected to the root 67 via buttresses 79. The root 67 has a neck area 81 and a serration area 83. The top surface 85 of the platform 65 is commonly referred to as a gas path, and the top of the airfoil 87 is commonly referred to as a tip 89. The tip 89 is generally referred to be at the outer diameter of the blade and the root bottom 90 is generally referred to be at the inner diameter of the blade 61.

Referring now to FIGS. 3, 3B, 3A and 4, blade 61 shows a support 91 that has a tree-like configuration. The support 91 has a trunk 93 that is generally thin at the tip 89 and increases in width as it goes toward the root 67. The trunk 93 is thinner at the tip 89 than it is at the platform. Limbs 95 extend outward from the trunk 93 in an upward angle so as to be self-supporting and to help channel the pull load into the trunk 93. The distal ends 97 of the limbs 95 are left open or have openings 99 so as to facilitate powder 101 removal as will be discussed infra. Intermediate holes 103 in the limbs 95 can also help with powder 101 removal. Also note that the angle of the limbs 95 (which may vary from limb to limb) help funnel the powder 101 toward the tip 89 of the blade 61 where the powder can exit an opening 105. This opening 105 may be left open or could sealed shut in subsequent manufacturing processes such as welding. One of ordinary skill in the art will recognize that the holes 103 and openings 99 are placed in such a manner to not affect load transmission to the trunk 93 from the limb(s) 95.

The support 91 is designed in regard to Pull/Area ratio (commonly referred to as P-on-A), Φ, which refers to an amount of weight or pull load along a cross-sectional area of an airfoil that the airfoil has to support. A cross-sectional area 107 (or layer, see FIG. 3A) has a trunk 93 and limb(s) 95 having sufficient strength to support the weight/pull load of the blade 61 extending to the tip 89. If a cross-section of the blade 61 is taken at point 109 that is closer to the root 67 than the cross-sectional area 107, the trunk 93 and limb(s) 95 would be thicker than the cross-sectional area 107 because there is more weight/pull load radially outward of the cross-sectional area 107. And, if a cross-section of the blade 61 is taken at point 111 that is radially outboard of the cross-sectional area 107, the trunk 93 and limb(s) 95 would be thinner than at the cross-sectional area 107 because the a P-on-A ratio Φ is less. The total P-on-A ratio for the blade 61 is the integral of the ratio Φ from the root 67 to the tip 89 or:

$$\int_{root}^{tip} \Phi dx = \text{blade pull load}$$

That is, support 91 must be able to withstand the blade pull load of the airfoil 63 plus a safety factor. By distributing the blade pull load between the trunk 93 and its limb(s) 95, the area of the trunk 93 may be minimized. The limbs 95 radiate from the trunk 93 along the interior of the blade 61 and extend radially outwardly at an angle α between the limb(s) and the trunk from the centerline A to efficiently pass the pull load of areas of the blade exterior attaching to the limbs to the trunk 93. The angle α between the limb(s) and the trunk, which might be around 45°+15° depending on the geometry of the blade 61, also minimizes stress risers in the joint 111 between the trunk 93 and the limbs 95, thereby minimizing the size of that joint 111. The limb(s) 95 may be offset from each other along a length of the trunk 95.

According to an alternative embodiment, a strut 113 (shown in phantom) may be placed transversely across a length of the airfoil 63 within the interior thereof to minimize the effects of compression on the airfoil 63. A strut 113 may also have apertures 115 therein to allow powder 101 to escape the interior of the airfoil 63.

Figure 3:
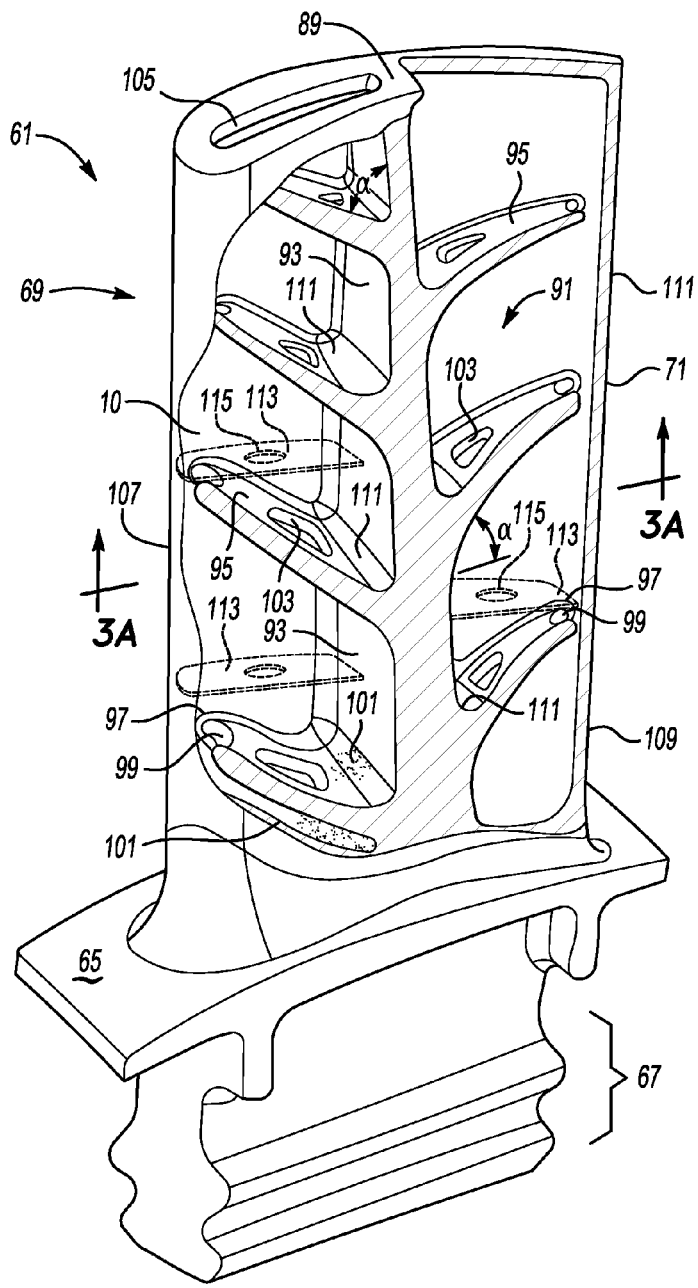
FIG. 3 shows a perspective, partially cut-away view of an airfoil of FIG. 2.
Figure 4:
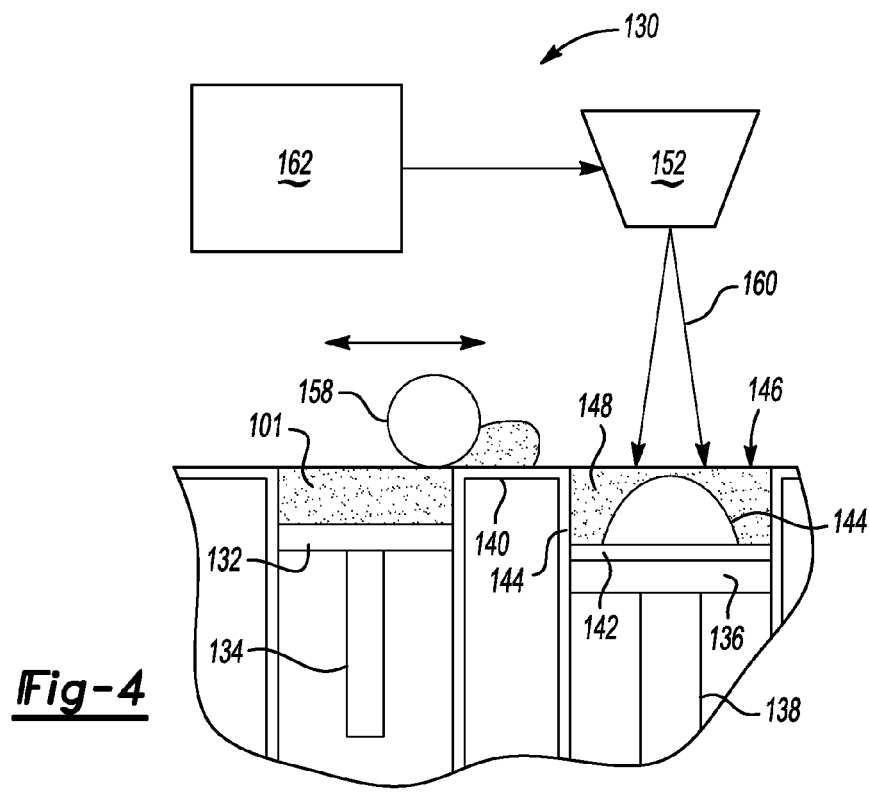
FIG. 4 shows a schematic view of a direct metal manufacturing tool making the airfoil of FIG. 2.

Referring to FIG. 4, a method of forming the blade 61 or airfoil 63 of FIGS. 2 and 3 is shown. A direct metal manufacturing tool 130 has a first platform 132 attached to first piston 134 and second platform 136 attached to second piston 138. Build-up material, such as powder 101 is pre-disposed on second platform 136. A distribution tool 158, such as a roller, is vertically aligned with the top of wall 140 and distributes a layer of powder 101 over wall 140 onto a base 142 arranged on first platform 132. The distribution tool 158 may move across the entire first platform 132 and second platform 134 to evenly distribute powder 101 on base 142. The distribution tool 158 then moves back to the first platform 132.

The wall 140, base 142, and side walls 144 form a cavity 146 to hold a bed 148 of powder 101. A beam source 152 heats predetermined portions of the powder 101 in the cavity 146 to form a cross-sectional layer of the blade 61 or airfoil 63 e.g., see FIG. 3.

After the cross-sectional layer 107 is formed, second piston 138 moves second platform 136 and base 142 downwards while first piston 134 moves first platform 132 and supply of powder 101 upwards such that another portion of the powder 101 is disposed above wall 140. The distribution tool 158 can then move more powder 101 into cavity 146 and onto the base 142 on the second platform 136 to begin the steps of forming another layer of blade 61 or airfoil 63. By arranging the second platform 136 and base 142 level or below the first platform 132, the distribution tool 158 is able to continuously add additional powder 101 to the already present powder 101 in the cavity 146 such that powder 101 in the cavity 146 forms the layers of the blade 61 or airfoil 63 through melting or sintering by the beam source 152.

In this example, the beam source 152 includes a laser, lenses, and a scanning mirror (not shown and as known in the art). However, other arrangements of beam sources 152, such as an electron beam or the like may be used. The beam source provides a laser beam 160 which is magnified by the lenses and redirected by the scanning mirror to contact a pre-determined portion of the powder 101 anywhere in the cavity 94 corresponding to a layer of the blade 61 or airfoil 63. The laser beam 160 heats the powder 101 to melt or sinter the powder 101, forming each layer of the blade 61 or airfoil 63. In one example, the laser beam 160 heats the powder 101 in the cavity 146 at a temperature in the range of 2300° F. to 2440° F. (1260° C.-1338° C.). However, one of ordinary skill in the art will recognize that other temperatures may be used depending on the materials used for the powder 101.

A 3D CAD model of a blade 61 or airfoil 63 may be created and place in a controller 162 for the tool 130. The controller 162, with assistance from a user, creates a build file that has the part properly oriented to make a blade 61 or airfoil 63 in the tool and then the controller instructs the tool 130 to create the blade or airfoil. In accordance with a build file instruction set (not shown), the controller instructs the tool to take cross-sections of the desired blade 61 or airfoil 63 and builds the part from the bottom up, one cross-section at a time by directing the laser beam 160 at areas to be solidified in each cross-section. While a cross-section solidifies, the controller instructs the first piston 134 to rise a certain distance depending on the thickness of the next cross-section and the second piston 138 to fall a corresponding distance. The distribution tool 158 then spreads the amount of powder 101 above the wall 140 across the wall 140 across the bed 148 augmenting its height and the laser beam then is activated to form another cross-section of the blade 61 or airfoil 63. The cross-sections are spaced from each other generally by the thickness of the mass of powder 101 caused by the heat of the laser beam 161. This distance may vary upon the type of material used. The powder 101 may, for instance, be a nickel, titanium, aluminum etc. or combinations thereof. Because the cross-sections are close to each other, e.g., ~20 micrometers, the intricate details of the support 91 are easily made relative to other methodologies.

Figure 3A:
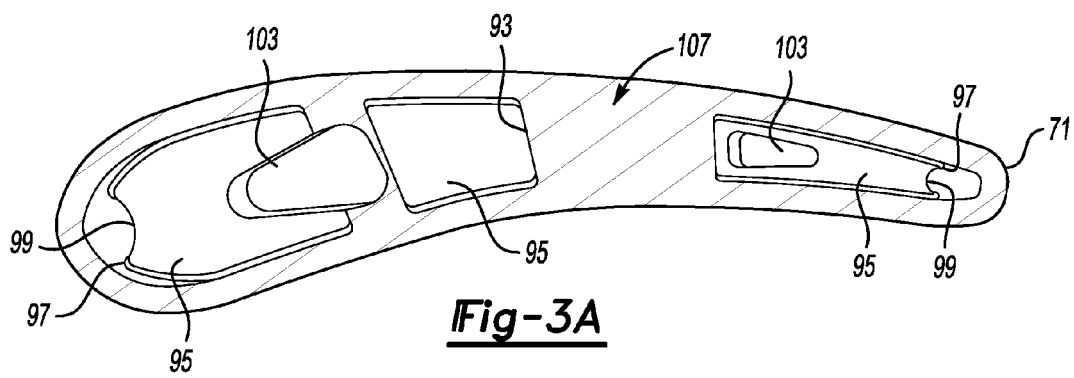
FIG. 3A is a cross-sectional view of the airfoil of FIG. 3.

As can be seen in the cross-sectional area 107 of FIG. 3A, not all of the powder 101 is sintered or melted by the laser beam 160 which means that there is powder 101 left within the blade 61 or airfoil 63 after manufacture is over. The unaffected powder 101 may escape through openings 99, ends 97 of the limbs 95, intermediate holes 103 in the limbs 95, and opening 105, with assistance of the angle α of the limbs relative to the trunk 93, by tipping the blade 61 over. Alternatively, a compressed air source may be used to blow the powder out.

Figure 5:
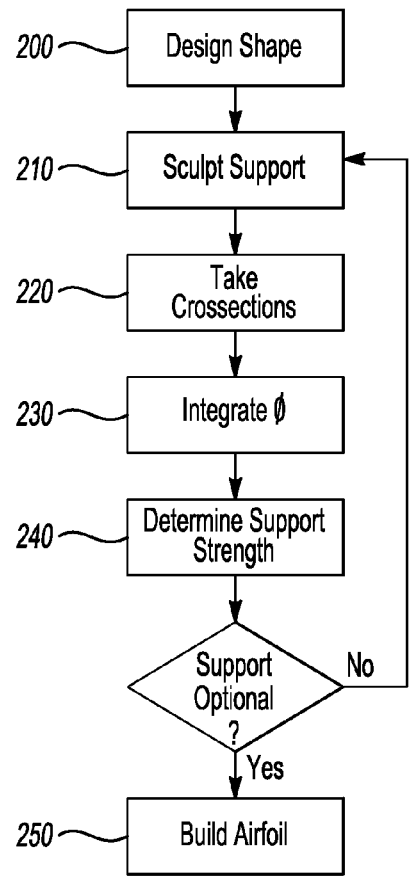
FIG. 5 shows a block diagram of a method to create an airfoil.

Referring to FIG. 5, to design a part a user creates a desired airfoil exterior shape 62 (step 200), sculpting an imaginary support (step 210) within the airfoil 63 that may withstand the P-on-A ratio of the airfoil 63 plus a safety factor, creates cross-sections of the airfoil 63 including the imaginary support (step 220), takes an integral of Φ for each cross-section (step 230), determines whether the imaginary support is sufficient to withstand the pull-on-A ratio of the airfoil 63 plus a safety factor, determining whether the imaginary support size and weight is optimized (step 240), resculpts the imaginary support if the imaginary support is either not sufficient or is not of optimal size, weight and shape to withstand the P-on-A ratio of the airfoil 63 plus a safety factor (step 210) until the imaginary support has an optimal weight, shape or size to withstand the P-on-A ratio of the airfoil 63 plus a safety factor after which the airfoil 63 is built (step 250).

One of ordinary skill in the art will recognize from the teachings herein that more than one set of trunk and branches may be provided in an airfoil depending on the performance requirements of that airfoil. One will also recognize that this methodology may be used to create portions of an airfoil or blade such as, for non-limiting instance, the trunk and limbs may be made as a separate piece that may be glued or otherwise attached to halves or other portions of an airfoil skin.

We claim:

1. A support for an airfoil, said support comprising:
   a trunk and a limb extending from said trunk for distribution within said airfoil;
   wherein said limb extends outwardly from said trunk and radially upwardly therefrom at an angle; and
   wherein said limb has an opening for eliminating powder left in said airfoil.

2. The support of claim 1 further comprising a strut extending cross-sectionally through said limb and said trunk.

3. The support of claim 1 wherein said angle is about 45°±15°.

4. The support of claim 2 wherein said strut having an opening for eliminating powder left in said airfoil.

5. The support of claim 1 wherein said limb further comprises a plurality of limbs.

6. The support of claim 5 wherein said limbs are offset from each other along a length of said trunk.

7. The support of claim 1 further comprising said airfoil enclosing and attaching to said trunk and said limb.

8. The support of claim 7 wherein said airfoil has an opening at a tip for allowing powder in said airfoil to escape therefrom.

9. The support of claim 7 further comprising a strut attaching to said airfoil, said trunk and said limb.

10. A method for constructing a support for an airfoil, said method comprising:
    creating a support having a trunk and a limb extending from said trunk for distribution within said airfoil by using a direct metal manufacturing tool, wherein said airfoil has an opening at a tip for allowing powder in said airfoil to escape therefrom; and
    removing powder in said airfoil by tipping said airfoil over.

11. The method of claim 10 further comprising:
    creating a 3D model of said trunk and limb.

12. The method of claim 11 further comprising:
    creating a build file of said 3D model.

13. The method of claim 12 further comprising:
    cross-sectioning said build file of said 3D model and sintering or welding a first layer of said airfoil including said support.

14. The method of claim 13 further comprising:
    building a plurality of layers atop said first layer until said airfoil including said support is finished.

15. A method of optimizing a size and shape of a support for an airfoil, said method comprising:
    designing a desired shape of an airfoil;
    estimating a desired shape for a support having a trunk and a limb extending from said trunk for distribution within said airfoil; and
    creating an integral of a Pull/Area ratio for cross-sections of said airfoil and said support within said airfoil.

16. The method of claim 15 further comprising:
    determining support strength of said support; and
    reforming said desired shape if said support strength does not withstand the integral of said Pull/Area ratio of the airfoil.

17. The method of claim 15 further comprising:
    determining support strength of said support; and
    reforming said desired shape if said support strength exceeds a minimum required to withstand the integral of said Pull/Area ratio of the airfoil.

\* \* \* \* \*